United States Patent [19]

Patel

[11] 4,119,118

[45] Oct. 10, 1978

[54] AUTOMATIC MACHINE MOTION RESTRICTING MECHANISM

[75] Inventor: Ramesh P. Patel, Hagerstown, Md.

[73] Assignee: Walter Kidde & Company, Inc., Clifton, N.J.

[21] Appl. No.: 759,240

[22] Filed: Jan. 13, 1977

[51] Int. Cl.[2] .............................................. F16K 31/44

[52] U.S. Cl. ...................................... 137/594; 251/57; 251/77; 403/31; 212/39 MS; 192/129 A

[58] Field of Search ....................... 251/57, 77; 403/31, 403/34; 74/583; 212/39 MS; 192/129 A; 137/594

[56] References Cited

U.S. PATENT DOCUMENTS

| | | | |
|---|---|---|---|
| 2,491,279 | 12/1949 | Rogers et al. | 74/583 |
| 3,062,587 | 11/1962 | Miller | 403/31 X |
| 3,286,465 | 11/1966 | Cerles et al. | 74/583 X |
| 3,298,658 | 1/1967 | Alyea | 251/11 |

*Primary Examiner*—Arnold Rosenthal

*Attorney, Agent, or Firm*—Brady, O'Boyle & Gates

[57] ABSTRACT

Fluid links are interposed between manual levers which control the motions of a machine such as a construction crane and associated spool valves which regulate the machine motions. In normal operation within predetermined safe limits of machine motions, pressurized fluid delivery valve means connected with the fluid links is conditioned by a normal signal from a safe machine motion sensing means and delivers pressurized fluid to the fluid links rendering the links "hard" so that the manual levers are enabled to effect safe machine motions. When an unsafe machine motion is sensed by the sensing means, the valve means responds to the interruption of the normal signal from the sensing means and is conditioned to interrupt delivery of pressurized fluid to the fluid links thus rendering the links "soft" and thus disabling the manual levers from causing machine motions beyond safe limits.

12 Claims, 6 Drawing Figures

AUTOMATIC MACHINE MOTION RESTRICTING MECHANISM

BACKGROUND OF THE INVENTION

Safe load signalling devices for construction cranes are known in the art and one example of the patented prior art is U.S. Pat. No. 3,641,551, for SAFE LOAD CONTROL SYSTEM FOR TELESCOPIC BOOM CRANES. Such devices or systems are also known in the art as load moment indicators.

It has also been proposed in the prior art to automatically restrict crane operating control levers against movements in directions which would allow or cause a dangerous load condition in connection with any principal crane function or motion, while allowing freedom of control lever movements in directions which cause reduction of crane loading and therefore do not adversely effect safety. One such prior art patented arrangement is disclosed in U.S. Pat. No. 3,792,780. In this patented system, the load moment indicator, in conjunction with a relay, conditions a solenoid operated valve to control a mechanical actuator which can return manual control levers on the crane to neutral positions. The mechanism automatically restricts the movements of the control levers in directions which would increase unsafe crane loadings while allowing unrestricted lever movements in other directions.

This patented system, while fully operational and reliable, is essentially mechanical in nature and comparatively complex and costly. Also, this mechanical system is not capable of providing control capability for selective operation in each of three different modes, namely, restricting a machine motion control device in one direction, restricting the machine motion control device in the opposite direction, or restricting the machine motion control device in both directions simultaneously.

Therefore, the principal objective of this invention is to improve on the prior art as exemplified in U.S. Pat. No. 3,792,780 by provision of an automatic disabling arrangement for the manual control levers of a crane, the arrangement being considerably simpler and less costly than comparable prior art arrangements, as well as more efficient and involving fewer adjustments. The system embodying the invention is particularly compatible with hydraulic cranes in view of the fact that the system includes hydraulic links and associated pressurized fluid delivery valve means, and therefore is hydraulic in nature, but it is understood that other fluids such as pressurized air may also be used in the system, so it can also be pneumatic in nature.

SUMMARY OF THE INVENTION

A fluid link formed by at least one cylinder-piston unit is connected between each machine or crane motion control manual lever and an associated control valve for the particular motion. When machine or crane motions are within safe limits, the fluid links are rendered "hard" so that the manual levers can transmit movement to movable members of the motion control valves. When machine or crane motions exceed safe limits, the fluid links are rendered "soft" in at least one direction so that control levers cannot transmit movement to the movable members of the control valves. A pressurized fluid delivery valve means connected with the fluid links is conditioned by a normal signal from a safe and unsafe machine or crane motion sensing device to deliver pressurized fluid to the fluid links to render them "hard". Interruption of the normal signal when an unsafe machine or crane motion is sensed conditions the delivery valve means to terminate delivery of pressurized fluid to the fluid links, rendering them "soft".

DETAILED DESCRIPTION

Figure 1:
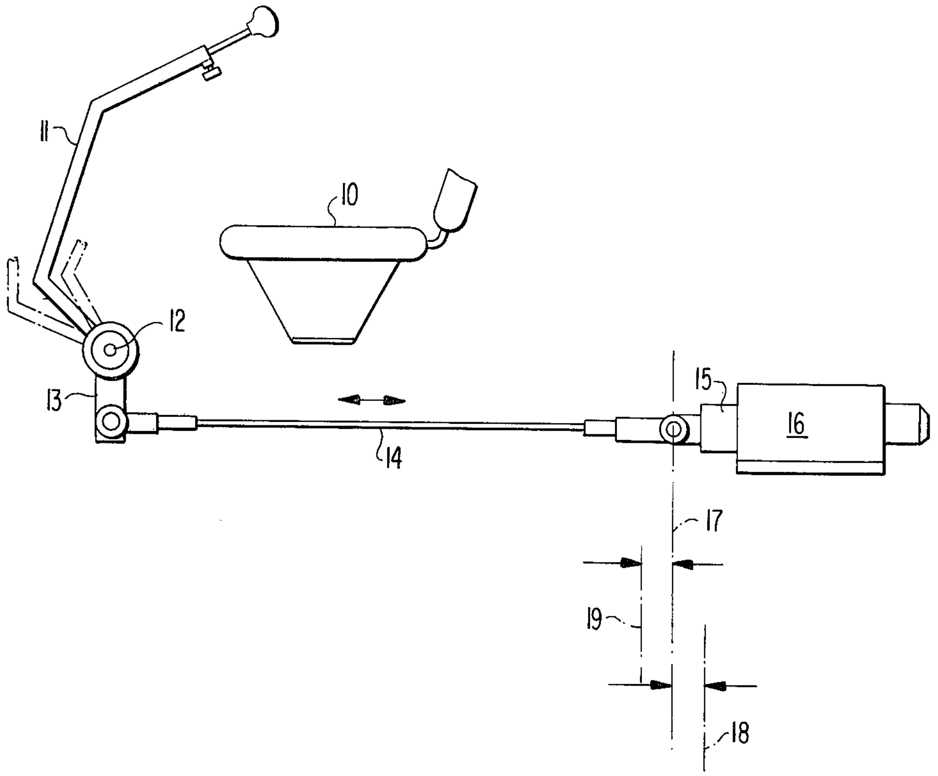
FIG. 1 PRIOR ART
FIG. 1 is a side elevational view of a typical control lever and valve arrangement for controlling a crane function or motion in accordance with prior art practice.

Referring to the drawings in detail wherein like numerals designate like parts, the invention will be described with respect to a crane but it is to be understood that it is applicable to the control system of a variety of machines. FIG. 1 illustrates a typical prior art control lever and valve arrangement, whereby the crane operator on the operator's seat 10 controls a particular crane function or motion by utilizing a manual lever 11 in a push or pull mode. The lever has a fixed pivot 12 and a depending crank arm 13 coupled with a shiftable rod 14 which is connected to a spool 15 of a conventional spool valve 16 of the "spring return to neutral" type. The valve 16 is shown in the neutral position at 17. The valve "spool in" and "spool out" positions are indicated at 18 and 19, respectively. It should be understood that in a complete system for controlling all vital crane motions, a plurality of the manual levers 11 and associated valves 16 is provided.

For example, the single lever 11 shown in FIG. 1 may control the operation of a crane main hoist or may control the extension and retraction of a telescoping boom, or the raising and lowering of such boom or some other motion.

In the arrangement of FIG. 1, the solid mechanical link through the rod 14 between the manual lever 11 and valve spool 15 enables the operator to shift the valve spool freely from its neutral position to either the "spool in" or "spool out" positions without restriction. As stated, the prior art contains teachings of means, such as mechanical means, to physically restrict the movements of the lever 11 to limit crane motions within safe limits. Such prior art lever restricting means are omitted in FIG. 1.

The following Chart A illustrates the various crane motions which an operator may control in the prior art by pushing or pulling particular manual levers in a complete system of levers and control valves.

Chart A

| | Function | Spool In | Spool Out |
|---|---|---|---|
| 1. | Hoist | Down | Up |
| 2. | Broom Lift | Down | Up |
| 3. | Broom Telescope | Out | In |
| 4. | Swing | Right | Left |

It is desirable and necessary for safe crane operation that some means be provided in the manual control system to restrict the essential crane motions within safe limits to prevent upsetting the crane or other serious difficulties. It is also essential that crane motions within safe limits remain unrestricted. As previously noted, U.S. Pat. No. 3,792,780 discloses a largely mechanical arrangement for restricting the movements of crane manual control levers in such a way that all crane motions remain within safe limits. To improve and simplify the known prior art for this purpose, the present invention in its broad aspect employs fluid links in the lever-valve crane control mechanism together with associated means to render the fluid links "hard"or "soft" as requirements dictate to allow lever movements to initiate all safe crane motions or to restrict crane motions beyond safe limits by disabling manual lever movements. Various adaptations of the invention are illustrated in drawing FIGS. 2 through 6.

In connection with the drawings, it should be pointed out that the solenoid operated valves therein are shown de-energized and the crane motion control spool valves are all shown at the neutral position. However, it will be seen that the normal condition of the solenoid operated valves is the energized condition where the valve solenoids respond to a normal and constant signal from a safe machine or crane motion sensing means, and deliver pressurized fluid to the fluid links to render the links "hard" so that safe crane motions are not restricted.

Figure 2:
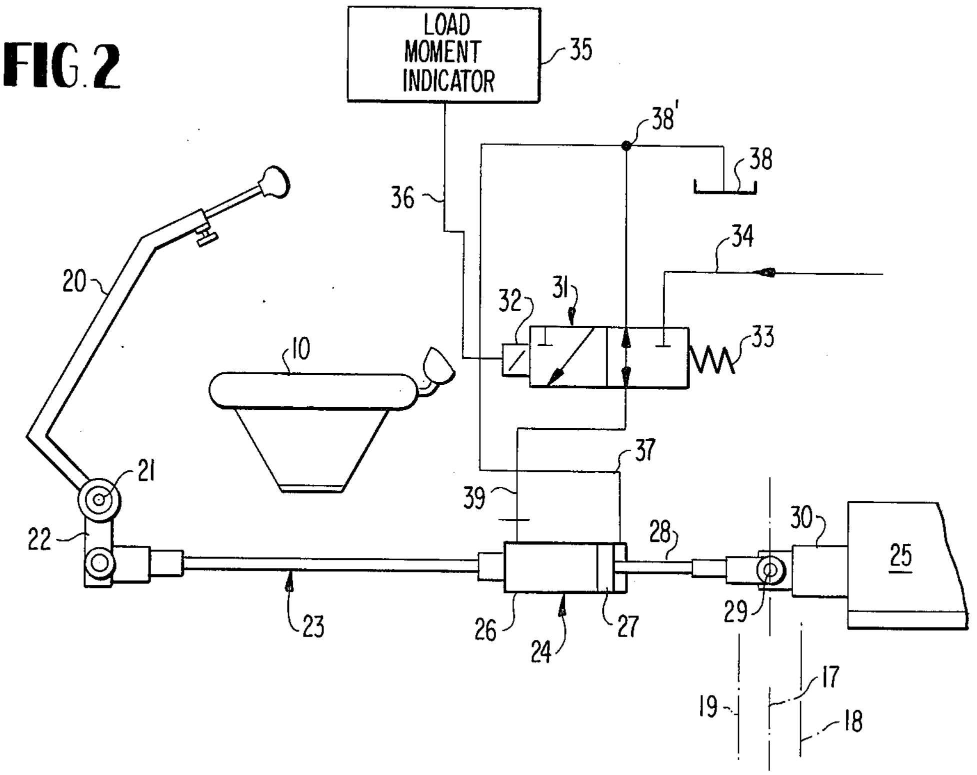
FIG. 2 is a comparable side elevational view, partly schematic, of a push mode crane motion control lever and valve arrangement having a fluid link and solenoid operated valve therein according to one embodiment of the invention.

Referring to FIG. 2, a single push mode manual lever 20 is shown having a fixed pivot 21 and a crank arm 22 extending below the pivot and coupled with a shiftable rod 23 having a fluid link 24 connected therein between the manual lever 20 and an associated crane motion control spool valve 25 of the "spring return to neutral" type. The fluid link 24 consists of a single cylinder-piston unit having a cylinder body 26 fixed to the forward section of rod 23, and a piston 27 whose rod 28 is coupled at 29 to the shiftable spool 30 of control valve 25.

The fluid link 24 operates in conjunction with a solenoid operated valve 31 which is a conventional three way-two position valve having a solenoid actuator 32 and an opposing biasing spring 33 which conditions the valve 31 to interrupt the delivery of pressurized fluid to the fluid link 24 when the solenoid 32 is de-energized. This de-energized condition which is not the normal operating condition is illustrated in the drawings, as explained. Pressurized fluid at a constant pressure from a source not shown is supplied to the valve 31 through a fluid line 34. A conventional load moment indicator 35 such as disclosed in U.S. Pat. No. 3,641,551 or an equivalent device senses safe and unsafe crane motions in terms of load moment and when safe motions are involved, the device 35 delivers a normal and constant electrical signal through a conductor 36 connected with the solenoid 32 to energize the solenoid and move the three way-two position valve 31 from its illustrated state to the condition where it will pass pressurized fluid from the line 34 to the cylinder body 26 via a fluid delivery line 39 interconnecting the cylinder body 26 with the valve 31. Thus, the normal operating condition of the valve 31, not shown, is the condition where pressurized fluid will be delivered to the fluid link 24 to render it "hard" so that all safe crane motions may be accomplished by manual lever manipulation. Another fluid line 37 is connected with cylinder body 26 at the piston rod end of the fluid link and this line leads to a fluid reservoir or sump 38, as shown. The line 39 can also communicate with the sump 38 through the solenoid operated valve 31 whenever the solenoid 32 is de-energized as illustrated in FIG. 2, the two lines 37 and 39 being joined at 38' downstream from the sump 38.

Considering FIG. 2 further, when a normal steady electrical signal is being delivered from load moment indicator 35 to energize solenoid 32 and condition valve 31 for delivery of pressurized fluid to cylinder body 26; this is the situation which prevails when the device 35 is sensing a particular crane motion within safe limits. Constant pressure fluid from the source line 34 then passes through the valve 31 and through delivery line 39 to the cylinder body 26 of the fluid link. This pressurized fluid ahead of the piston 27 renders the fluid link "hard". Therefore, if the crane operator pushes lever 20 forwardly, as for lowering the crane boom under a given load, within safe limits, such lever movement is transmitted by the "hard" link 24 to control spool valve 30 shifting the latter from neutral to the "spool in" position 18 and the crane boom will be lowered. Similarly, the operator may pull the lever 20 rearwardly to elevate the boom, which will be a safe motion, and the fluid link 24 is also "hard" in this direction as the piston 27 is at the rear end of cylinder body 26 and there can be no further relative movement between the cylinder body and piston. Therefore, the fluid link is "hard" in both directions while the solenoid 32 remains normally energized by a steady signal from the load moment indicator 35.

In any situation where the device 35 is sensing an upcoming crane motion which is outside of safe limits, the normal signal through the conductor 36 is interrupted and the solenoid 32 is de-energized and the valve 31 will return to the condition illustrated in FIG. 2 where pressurized fluid from the line 34 cannot be delivered to the cylinder body 26. In this situation with the absence of pressure between the piston 27 and cylinder body 26, the fluid link 24 is "soft" or yielding in response to a forward pushing of the manual lever 20, as for lowering a crane boom to an unsafe angle or for initiating any unsafe crane motion. Such forward movement of the lever 20 will simply cause the cylinder body 26 to telescope over the stationary piston 27 and no movement will be transmitted to the valve spool 30 and therefore the unsafe crane motion is restricted or prevented by the "soft" fluid link 24. However, if the lever 20 is pulled rearwardly to elevate the crane boom, which is a safe movement, the link 24 will be "hard" to allow this safe motion because the piston 27 is solidly at the end of cylinder body 26, FIG. 2.

When the link 24 is "soft", as described, due to conditioning of the valve 31 as illustrated in FIG. 2, when the lever 20 is pushed forwardly and cylinder body 26 telescopes over the piston 27 toward the valve 25, fluid is discharged from cylinder body 26 through the line 39 and through the valve 31 back to the sump 38. Simultaneously, by suction and siphoning, fluid is delivered from the sump and through line 37 to the piston rod end of cylinder body 26. Therefore, the fluid link 24 remains filled with fluid at all times on both sides of the piston but in the "soft" state of the link, the fluid can circulate freely through the lines 39 and 37, as described, whereas, in the "hard" state of the link 24, there can be no such circulation of the fluid.

If during normal operation with the manual lever 20 pushed forward, as for lowering a crane boom, the crane moves outside of safe limits due to the lowering motion or some other crane motion, the device 35 sensing the unsafe load moment interrupts the normal signal through conductor 36 and the solenoid 32 is de-energized and the valve 31 returns to the condition illustrated in FIG. 2. With the absence of pressure between the piston 27 and cylinder body 26, the fluid link 24 becomes "soft" and the valve spool 30 of spool valve 25 is returned by the return spring within the valve from the "spool in" position 18 to the neutral position 17, stopping further motion of the crane toward the unsafe condition such as stopping the lowering of the crane boom, even through the manual lever 20 is pushed forward. The spring return to neutral action of valve spool 30 causes piston 27 to move to the left, in and relative to cylinder body 26, causing fluid to be discharged from the far end of cylinder body 26 through line or conduit 39, through valve 31 and partly back to the sump 38 and partly circulated by siphoning through line 37 to the piston rod end of cylinder body 26. Pulling rearwardly on manual lever 20 will move cylinder body 26 to the left relative to piston 27 causing fluid to circulate from the piston rod end of the cylinder through line 37 back through line 39 to the cylinder head end of the cylinder body 26 until piston 27 is solidly at the end of cylinder body 26 after which the "hard" link thus established will shift valve spool 30 from the neutral position 17 to the "spool out" position 19, causing a safe movement of the crane, such as, raising the crane boom.

It should be noted that the fluid lines 37 and 39 are vented and not under pressure. However, in practice, a small positive pressure of about 25 psi may exist in the lines due to fluid inertia caused by relative movements of the cylinder body 26 and piston 27. In contrast to this, the fluid coming from the line 34 is at a constant pressure of approximately 200–300 psi for rendering the fluid link 24 rigid, as described.

The following Chart B illustrates the control capabilities of the manual lever 20 in the embodiment of FIG. 2:

Chart B

| | | Control Lever Action | |
|---|---|---|---|
| | Condition | Spool In | Spool Out |
| 1. | Solenoid Valve De-Energized | No | Yes |
| 2. | Solenoid Valve Energized | Yes | Yes |
| 3. | Loss of Current to Solenoid | No | Yes |
| 4. | Solenoid Burnt-Out | No | Yes |

Considering this chart, it can be understood that the invention embodies a fail-safe feature. That is to say, whenever the solenoid 32 is de-energized by termination of the signal from the load moment indicator 35 or by burn-out or loss of current for any reason, the fluid link 24 is instantly rendered "soft" and unsafe crane motions responsive to manual lever pushing are rendered impossible.

Figure 3:
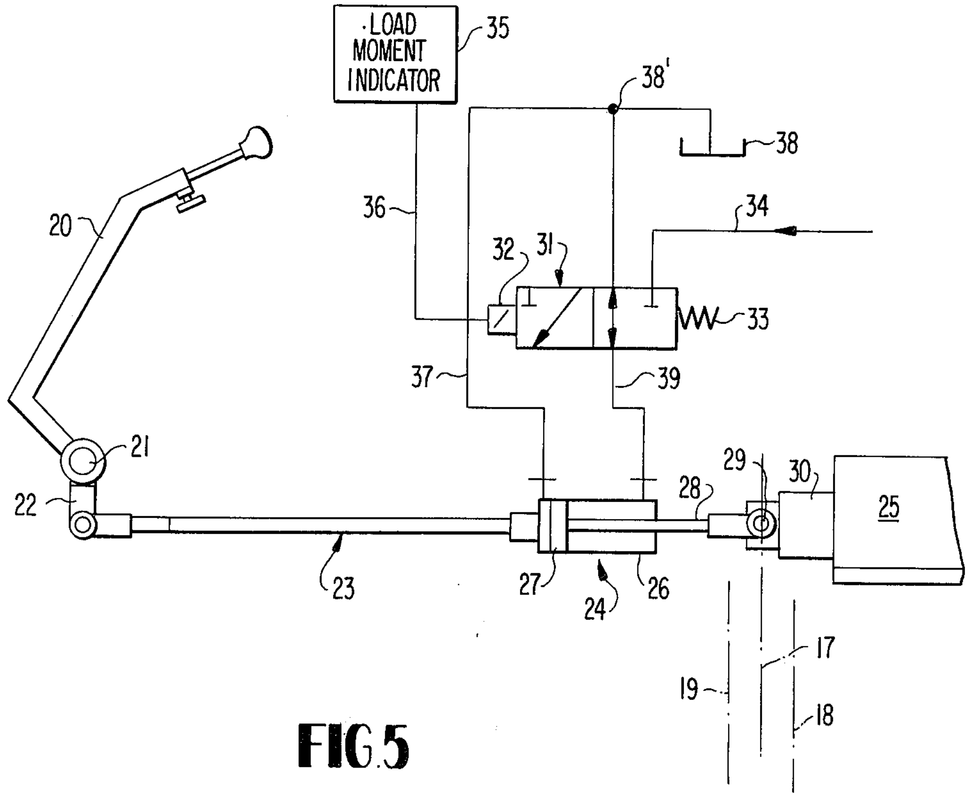
FIG. 3 is a similar view of a pull mode crane motion control lever and valve arrangement having a fluid link and associated solenoid operated valve according to another embodiment of the invention.

FIG. 3 shows the invention utilized with the manual lever 20 in a pull mode rather than a push mode, as described for FIG. 2. The physical construction is exactly the same as described for FIG. 2 except that the connections of the fluid lines 37 and 39 with cylinder body 26 are reversed end-for-end on the cylinder body, and the piston 27 is normally fully retracted in cylinder 26 in the neutral position of manual lever 20.

When a safe crane motion of any type is sensed by the device 35 and the normal steady electrical signal from the sensing device is maintaining the solenoid 32 energized, the valve 31 will be conditioned to deliver pressurized fluid from the line 34 into the cylinder body 26 behind the piston 27, or on the rod side thereof. This renders the fluid link 24 "hard". Therefore, when the operator pulls the lever 20 rearwardly to initiate a safe crane motion, such lever movement will be transmitted through the "hard" fluid link to shift the associated valve spool 30 to the "spool out" position 19 as there can be no relative movement between the cylinder body 26 and piston 27. Similarly, if the lever 20 is pushed forwardly, the fluid link 24 will be "hard" because the piston is at the head end of the cylinder body, and the lever movement will be effective to shift the valve spool 30 to the "spool in" position 18.

In FIG. 3, when the device 35 senses an oncoming crane motion beyond safe limits, it will terminate the signal to the solenoid 32 and the solenoid will be de-energized to condition the valve 31 in the illustrated manner where no pressurized fluid can be delivered from the line 34 to the fluid link 24. Therefore, the fluid link is "soft". Now, when the lever 20 is pulled rearwardly, its movement is disabled by the "soft" fluid link so that the unsafe crane motion cannot be initiated. More particularly, when the lever 20 is pulled rearwardly, the rod 23 and cylinder body 26 will shift to the left in FIG. 3 relative to stationary piston 27 and no movement of the spool 30 and therefore no crane motion will occur. Fluid from the cylinder body 26 will exhaust through line 39 and through valve 31 to the sump 38. Simultaneously, fluid will be drawn from the sump through line 37 and will enter the cylinder body 26 ahead of the piston 27 in the necessary volume to keep the system fluid filled.

With the solenoid 32 de-energized and the fluid link "soft" and if the lever 20 is pushed forwardly to cause a reversal of the aforementioned crane motion, in other words a safe motion, such motion will be transmitted through the link 24 to the valve spool 30 because the piston 27 is at the head end of the cylinder body making the link 24 "hard" in one direction only. It can be appreciated that the invention is extremely simple in construction and involves mainly standard commercial components as distinguished from the much more costly and complex prior art.

The following Chart C explains the operational capabilities of the manual lever 20 in the elemental pull mode of FIG. 3.

Chart C

| | | Control Lever Action | |
|---|---|---|---|
| | Condition | Spool In | Spool Out |
| 1. | Solenoid Valve De-Energized | Yes | No |
| 2. | Solenoid Valve Energized | Yes | Yes |

Chart C-continued

| | Condition | Control Lever Action | |
|---|---|---|---|
| | | Spool In | Spool Out |
| 3. | Loss of Current to Solenoid | Yes | No |
| 4. | Solenoid Burnt-Out | Yes | No |

Figure 4:
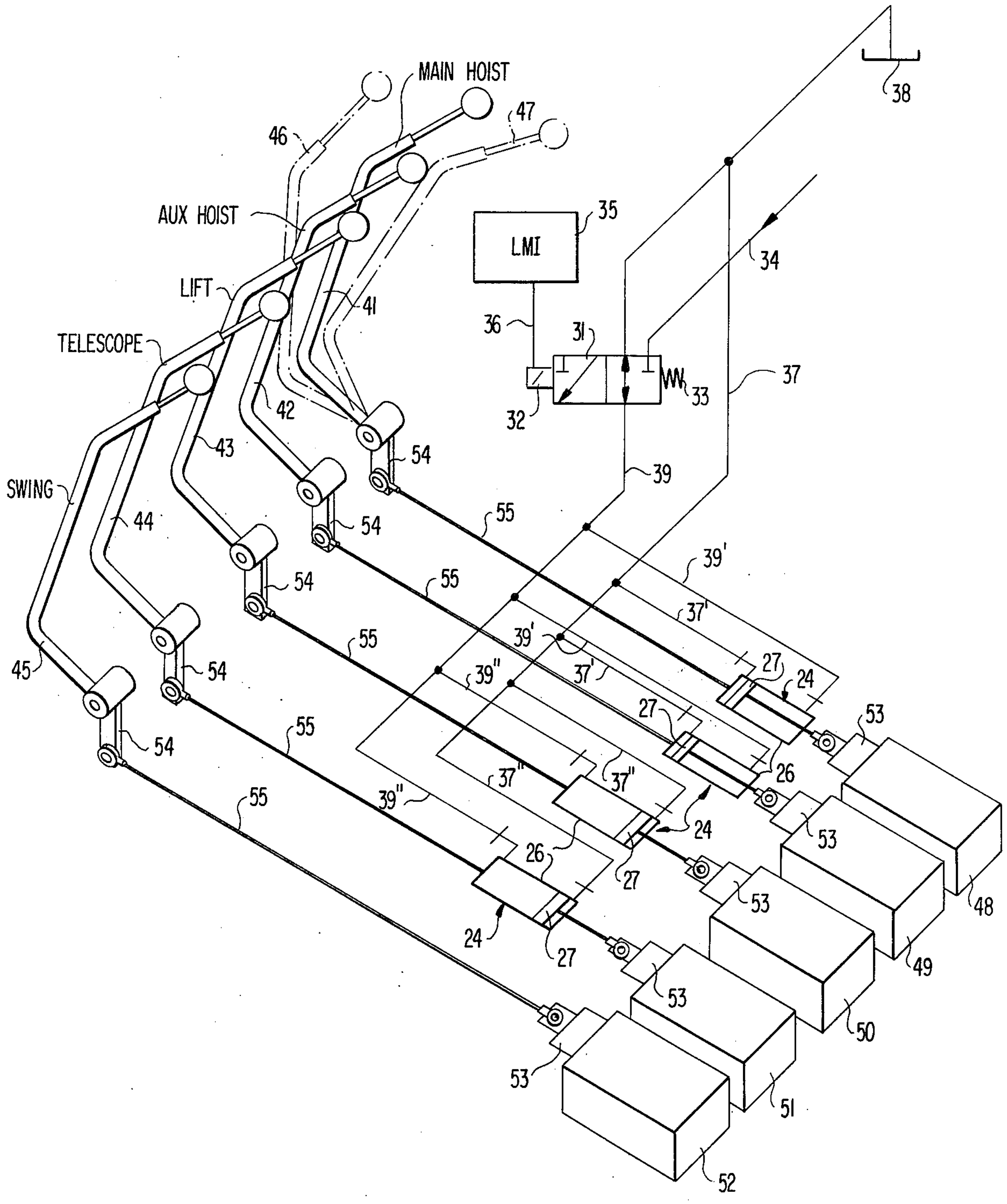
FIG. 4 is a perspective view, partly schematic, showing a complete crane motion control lever system embodying the invention in terms of the arrangements shown in FIGS. 2 and 3.

FIG. 4 shows the invention embodied in a complete multi-lever crane motion control system according to the teachings of elemental FIGS. 2 and 3. In this system, a main hoist control lever 41 is shown along with an auxiliary hoist lever 42, a crane boom raising and lowering lever 43, a boom telescoping lever 44, and a turntable swing lever 45. As shown in broken lines for the lever 41, each lever has a maximum forward (pushed) position 46 and a maximum rearward (pulled) position 47. The several levers are shown in full lines in their neutral positions in FIG. 4. Conventional stop means, not shown, are utilized to limit the forward and rearward swing of the manual levers in the system.

Each of the levers 41 to 45 operates a crane motion control valve 48, 49, 50, 51 and 52 of the previous-described type, each valve having a shiftable spool 53 the spools being shown in their neutral positions under influence of spring means. A crank arm 54 of each manual lever is connected with a shiftable rod 55 and the rods for all levers except the turntable swing lever 45 have connected therein one of the described fluid links 24 consisting of a cylinder body 26 and a piston 27. When the several control levers of the system are in neutral, FIG. 4, the cylinder bodies 26 are all fully extended or fully retracted relative to pistons 27, as illustrated.

The previously-described load moment indicator 35 is shown in FIG. 4 electrically linked by conductor 36 with the solenoid 32 of the three way-two position solenoid operated valve 31. The described fluid sump 38 is shown from which fluid at proper times may be withdrawn by siphoning through the line 37 and through branch lines 37' and 37'' and into the ends of cylinder bodies 26 ahead of and behind the pistons 27, respectively.

Fluid line 39 is also shown in the system, FIG. 4, through which pressurized fluid from the source line 34 is delivered while solenoid 32 remains energized to the several cylinder bodies 26 via branch fluid lines 39' and 39''. The branch lines 39' deliver pressurized fluid into the piston rod ends of two cylinder bodies 26, while the lines 39'' deliver the fluid into the head ends of two of the cylinder bodies.

The operation of the system in FIG. 4 is consistent with the descriptions for the single lever and valve arrangements in FIGS. 2 and 3. With a steady electrical signal from the device 35 keeping the solenoid 32 normally energized and the valve 31 normally conditioned to deliver pressurized fluid from the line 34 to the several cylinder bodies 26, the fluid links 24 are all rendered "hard" and able to transmit manual lever movements to the control valve spools 53. As the solenoid 32 is energized only when safe crane motions are sensed by the device 35, the fluid links 24 will be "hard" only at such times as the manual levers 41 to 44 will initiate safe motions of crane components. It can be seen in FIG. 4 that with the fluid links 24 "hard" pushing or pulling of the manual levers can effectively shift the spools 53 to either their "spool in" or their "spool out" positions.

When the device 35 senses any unsafe crane motion upcoming, solenoid 32 will be de-energized and valve 31 will be conditioned as shown in FIG. 4 and pressurized fluid is no longer delivered via line 39 to the fluid links 24 and the links become "soft". While "soft", relative movements between the cylinder bodies 26 and pistons 27 will cause fluid to flow through the lines 39' and 39'' and through line 39 to the sump 38, and simultaneously, fluid will be withdrawn from the sump and delivered through line 37 and branch lines 37' and 37'' to the cylinder bodies 26.

While the fluid links 24 are thus "soft", it can be seen that pulling the levers 41 and 42 rearwardly will be ineffective to shift the spools 53 of valves 48 and 49 to their "spool out" positions while forward pushing of these two levers remains effective to shift the valve spools to their "spool in" positions. Therefore, the two levers 41 and 42 of the system are disabled in one direction of movement from effecting movement of the spools of the two valves 48 and 49 and this is the direction of lever movement which would otherwise initiate unsafe crane motions.

Similarly, with the fluid links "soft" the two manual levers 43 and 44 are disabled in one direction of movement and are enabled in the opposite direction. These directions are reversed in the system compared to the levers 41 and 42 and this can easily be understood by noting the relative relationships of the pistons 27 and cylinder bodies 26 for fluid links 24 associated with the two pairs of levers 41-42 and 43-44. In the system of FIG. 4, there is no fluid link between the swing lever 45 and its associated valve 52 and therefore the invention has no effect on the operation of the swing lever.

Figure 5:
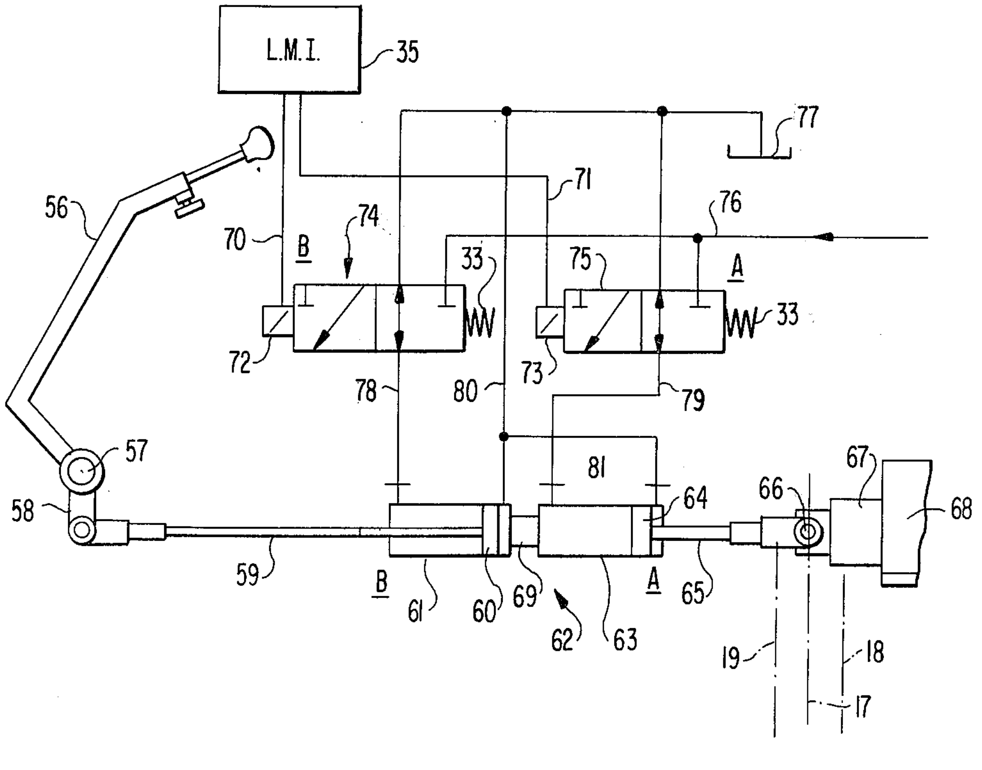
FIG. 5 is a further view, similar to FIGS. 2 and 3, showing a push-pull mode crane motion control lever and valve arrangement with combination fluid link and associated solenoid operated valves electrically coupled with the crane load moment indicator.

FIG. 5 illustrates the invention in conjunction with a manual control lever 56 which is employed in a combined push and pull mode in connection with crane motions. The lever 56 has a fixed pivot 57 and a depending link 58 coupled with a push-pull rod 59 which is the rod of a piston 60 within the first cylinder body 61 of a dual cylinder fluid link 62 having a second cylinder body 63 and piston 64 in opposing relation to the first piston 60. The rod 65 of piston 64 is coupled at 66 with a spool 67 of a crane motion control valve 68. The two cylinder bodies 61 and 63 of fluid link 62 are rigidly joined at 69.

FIG. 5 includes the load moment indicator 35 connected in parallel by conductors 70 and 71 with solenoids 72 and 73 of first and second solenoid operated valves 74 and 75. Both valves 74 and 75 are connected with a pressurized fluid supply line 76 to receive fluid therefrom, as shown. As in the other drawing figures, the two valves 74 and 75 are shown conditioned as when solenoids 72 and 73 are de-energized. Normally, however, as explained, the solenoids remain energized under a steady signal from the device 35 and normally the valves 74 and 75 are conditioned to deliver pressure fluid from the line 76 to the two cylinder bodies 61 and 63.

In FIG. 5, a fluid sump 77 is connected through lines 78 and 79 with the two valves 74 and 75 so that when the solenoids 72 and 73 are energized, these two lines will deliver pressurized fluid to cylinder bodies 61 and 63. When the two solenoids are de-energized as illustrated, to render the fluid link "soft", relative movements between the cylinder bodies and their pistons 60 and 64 will cause fluid to pass through the lines 78 and 79 and through the valves 74 and 75 to the sump 77.

Additional fluid lines 80 and 81 communicate with the sump 77 and the two cylinder bodies 61 and 63 at the head and piston rod ends thereof respectively. When the fluid link 62 is "soft" and while fluid is returning to the sump via lines 78 and 79, as described, fluid is being siphoned from the sump and delivered into the opposite ends of the two cylinder bodies 61 and 63 via lines 80 and 81.

In the normal situation where the device 35 is sensing a safe crane motion and is emitting a steady signal keeping solenoids 72 and 73 energized, the valves 74 and 75 will deliver pressure fluid from the source line 76 through lines 78 and 79 into the two cylinder bodies 61 and 63 thus rendering the fluid link 62 "hard". In this situation, when the lever 56 is pushed forwardly to shift the rod 59 toward valve spool 67, its motion will be effective to move the valve spool to the "spool in" position 18 thus causing the desired safe crane motion. Both cylinder-piston units of the fluid link 62 are "hard" at this time. If the manual lever 56 is pulled rearwardly, thereby shifting rod 59 to the left in FIG. 5, the entire fluid link 62 is still rigid and the lever motion will be effective to shift the spool 67 to the "spool out" position 19.

When the device 35 senses the onset of an unsafe crane motion, the electrical signal to the solenoids 72 and 73 ceases and the solenoids are de-energized, and the valves 74 and 75 are as shown in FIG. 5. This renders the fluid link 62 "soft" in both of its cylinder-piston units or sections. Therefore, movement of the lever 56 forwardly by pushing and shifting of the rod 59 to the right cannot move the spool 67 to the "spool in" position because the cylinder body 63 will telescope over the relatively stationary piston 64. Similarly, pulling the lever 56 rearwardly and shifting the rod 59 to the left will not cause the spool 67 to move to the "spool out" position because in this case, with the fluid link "soft", the piston 60 will simply move to the rod end of cylinder body 61. Therefore, the system disables the lever 56 from effecting unsafe crane motions in either direction of lever movement when the solenoids are de-energized and fluid link 62 is "soft". While not illustrated in FIG. 5, the load moment indicator 35 can be connected with the solenoids 72 and 73 so that one or the other solenoid can be energized selectively while the other solenoid is de-energized and vice-versa. The following Chart D illustrates the control capabilities which are possible to obtain under the invention with a fluid link of the type shown in FIG. 5 and two associated solenoid operated valves as illustrated and in the alternative arrangement discussed above but not illustrated.

Chart D

| | | Control Lever Action | |
|---|---|---|---|
| | Condition | Spool-In | Spool-Out |
| 1. | Both Solenoid Valves De-Energized | No | No |
| 2. | Both Solenoid Valves Energized | Yes | Yes |
| 3. | Solenoid Valve A-Energized B-De-Energized | Yes | No |
| 4. | Solenoid Valve A-De-Energized B-Energized | No | Yes |

In case of loss of current or burnt solenoid lock out will result in one or both directions as the case may be.

Figure 6:
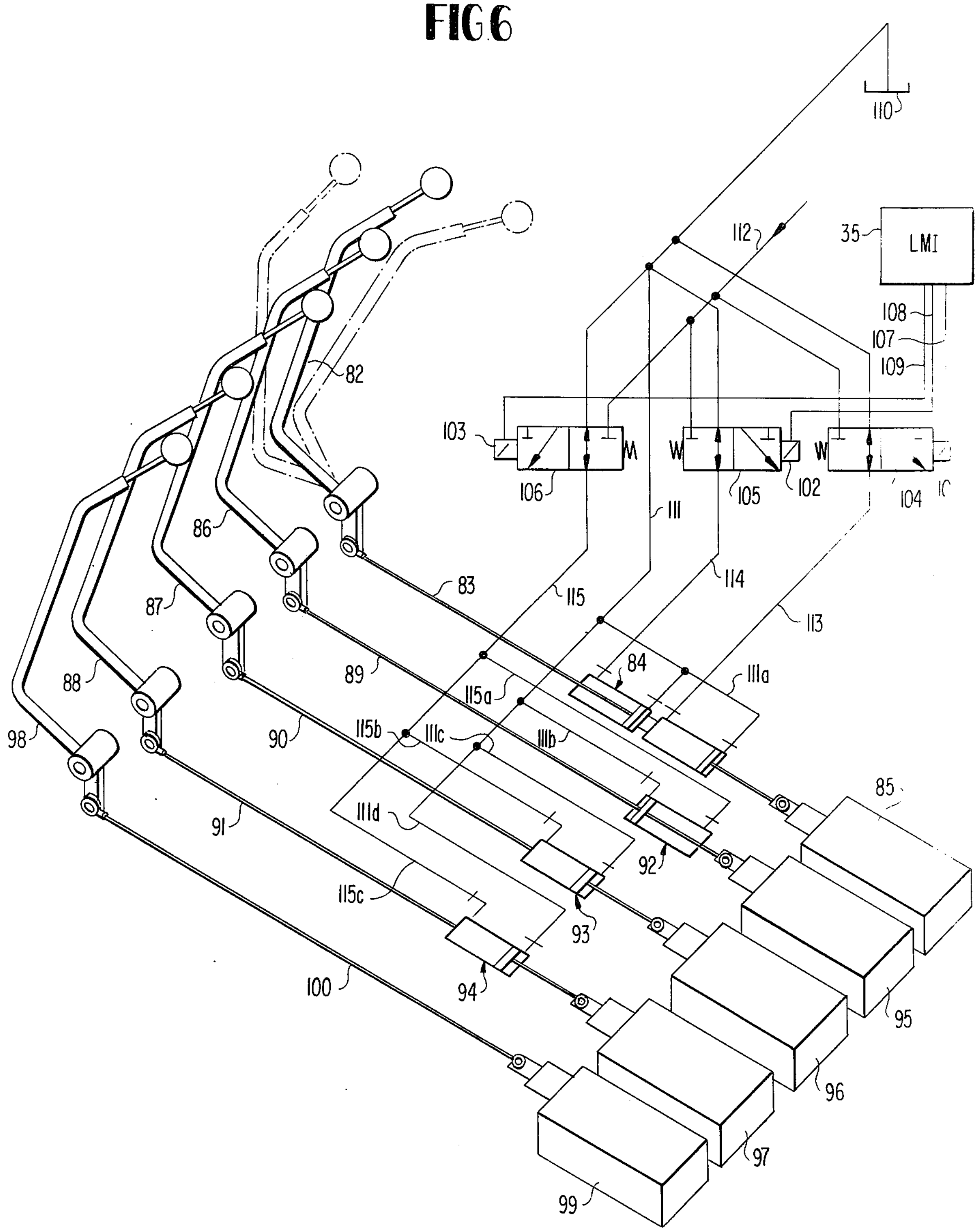
FIG. 6 is a perspective view, similar to FIG. 4, showing a complete crane motion control lever and valve system with fluid links and solenoid operated valves therein in terms of the construction shown in FIG. 5.

FIG. 6 illustrates a crane motion control system which embodies one of the push-pull mode lever arrangements according to FIG. 5 in association with additional manual lever arrangements of the types shown in FIGS. 2 and 3. In this connection, a variety of operational systems can be created embodying the invention and the systems in FIGS. 4 and 6 are simply two typical examples of what can be done under the invention in terms of its versatility.

In FIG. 6, a control lever 82 is connected with a push-pull rod 83 in a fluid link 84 of the dual cylinder type shown in FIG. 5. The fluid link 84 links or connects the manual lever 82 with a crane motion control valve 85.

Additional crane motion control levers 86, 87 and 88 are included in the system and are connected through rods 89, 90 and 91 with single cylinder fluid links 92, 93 and 94, such links being connected with the spools of crane motion control valves 95, 96 and 97. Additionally, a manual lever 98, such as a turntable swing control lever, is connected with its associated control valve 99 by a solid mechanical link or rod 100. In view of foregoing detailed descriptions in the application, it is unnecessary to describe the mechanism in FIG. 6 in greater detail.

The system includes the load moment indicator 35 connected in parallel with solenoids 101, 102 and 103 of valves 104, 105 and 106 by conductors 107, 108 and 109. The pair of valves 104 and 105 service the dual cylinder fluid link 84 as described in FIG. 5, while the single valve 106 services the single cylinder fluid links 92, 93 and 94 exactly as described in the system shown in FIG. 4. The complete description of operation need not be repeated.

A fluid sump 110 can receive or supply fluid from the cylinder bodies of the fluid links 84, 92, 93 and 94 via a common fluid line 111 having parallel connected branch lines **111*a*, 111*b*, 111*c* and 111*d*. Pressurized fluid from a source line 112 is delivered to the three valves 104, 105 and 106 when the solenoids of these valves are in the normally energized state responsive to a signal from the device 35. At this time, the pressurized fluid passes through the three valves 104, 105 and 106 to fluid delivery lines 113, 114 and 115. The lines 113 and 114 supply pressurized fluid to the dual cylinder fluid link 84 to render it "hard". The line 115 delivers pressurized fluid to the single cylinder links 92, 93 and 94 via branch lines 115*a*, 115*b* and 115*c***, as shown.

Again, it is thought to be unnecessary to describe in detail the complete operation of the system in FIG. 6 because the previous operational descriptions enable anyone skilled in the art to fully understand the operational capabilities of the system in FIG. 6. In all cases, the invention utilizes the fluid links between the manual levers and their associated spool valves to assure safe crane motions or functions at all times and under all conditions. When any crane motion beyond safe limits is sensed by the device 35, the normal steady signal from the device is terminated and the normally energized solenoids of the three way-two position valves of all embodiments are de-energized to render the fluid links "soft", thus disabling the manual levers at least in one direction of movement so that unsafe crane motions are restricted while safe motions are not restricted.

Sometimes the direction in which the movement of the control lever would allow or cause a dangerous load condition in connection with any principal crane function changes with the change in crane configuration in use. The selective control capability of push-pull mode lever arrangement, according to FIG. 5, becames a must in this situation. One such example could be cited when the main hoist in a crane is used to hoist the load in normal crane configuration and is used to luff the jib when luffing jib crane configuration is in use. In this case, the movement of the control lever in the hoist-up direction would allow or cause a dangerous load condition when the crane is in normal crane configuration. However, the movement of the control lever in the hoist-down direction would allow or cause a dangerous load condition when the luffing jib crane configuration is in use. FIG. 6 illustrates a crane motion control system when the crane is available with a luffing jib. In a crane with a variety of configurations, the load moment device 35 is equipped with a configuration selector switch. The same switch could also be used to select the appropriate puh or pull mode lever arrangement.

In terms of simplicity of construction, economy of manufacture and ability to utilize standard commercial components, the present invention possesses great advantage over the arrangement in prior U.S. Pat. No. 3,792,780, as noted.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. In a mechanism for restricting unsafe machine motions without restricting safe machine motions, a manual control element movable to initiate a machine motion, a machine motion control device associated with said manual control element, a fluid link connected between said manual control element and said control device, and means including a pressurized fluid supply device connected with said fluid link for delivering pressurized fluid to and for receiving pressurized fluid from said fluid link and operable to render the link "hard" in both directions of movement of said manual control element, or "soft" in at least one direction of movement of said manual control element selectively, and a safe and unsafe machine motion sensing apparatus coupled with said pressurized fluid supply device and normally conditioning the supply device to deliver pressurized fluid to said fluid link to render the link "hard", said sensing apparatus adapted to condition the supply device to interrupt the delivery of pressurized fluid to the fluid link, whereby the link is rendered "soft" in at least one direction of movement of the manual control element when the sensing apparatus senses an unsafe machine motion.

2. In a mechanism as defined in claim 1, and said pressurized fluid supply device comprising an electrically operated valve, and said sensing apparatus comprising an electrical means which delivers an electrical signal to said valve while sensing a safe machine motion to condition the valve to deliver pressurized fluid to the fluid link, the electrical signal terminating when the sensing means is sensing an unsafe machine motion and then conditioning said valve to block the delivery of pressurized fluid to the fluid link.

3. In a machanism as defined in claim 1, and said fluid link comprising at least one cylinder-piston unit having fluid connections with said means near the ends of the cylinder of said unit and on opposite sides of the piston of said unit.

4. In a mechanism as defined in claim 3, and said manual control element comprising a pivoted lever connected with one end of said cylinder-piston unit, and said machine motion control device comprising a control valve having a shiftable member connected with the other end of said cylinder-piston unit.

5. In a mechanism as defined in claim 1, and said fluid link comprising a pair of cylinder-piston units connected in fixed tandem relationship, the pistons of said units being connected with said manual control element and said machine motion control device, and said means comprising a pair of pressurized fluid delivery devices one for each cylinder-piston unit of said fluid link, and said safe and unsafe machine motion sensing apparatus connected with said pressurized fluid delivery devices and conditioning the devices to deliver pressurized fluid to said units when a safe machine motion is sensed and to terminate the delivery of pressurized fluid to said units when an unsafe machine motion is sensed.

6. In a mechanism as defined in claim 1 which comprises a complete machine motion control system, additional manual control elements and machine motion control devices in coacting pairs to control a plurality of machine motions, additional fluid links connected between the manual control elements and control devices of said pairs, and said means being common to all of the fluid links in said system and being connected to each fluid link and including a device to selectively deliver pressurized fluid to the fluid links or interrupt the delivery of said fluid responsive to the activity of a safe and unsafe machine motion sensing means.

7. In a mechanism as defined in claim 6, and said fluid delivery and interrupting device comprising a two position valve adapted for connection with a source of pressurized fluid and moving from a fluid delivery position to a fluid blocking position when safe and unsafe machine motions, respectively, are being sensed.

8. In a mechanism as defined in claim 1, and said fluid link comprising a cylinder-piston unit with one element of the unit connected to said manual control element and the other element of the unit connected to said machine motion control device, a two way pressurized fluid delivery valve having a fluid delivery and a fluid discharge connection with said unit, said safe and unsafe machine motion sensing apparatus operatively connected with said valve and normally conditioning the valve to deliver pressurized fluid to said unit when a safe machine motion is sensed and conditioning the valve to block the delivery of pressurized fluid to said unit when an unsafe machine motion is sensed, and said cylinder-piston unit having a second fluid connection by means of which substantially unpressurized fluid may enter said unit when said fluid link is "soft" and said valve is blocking delivery of pressurized fluid to the unit.

9. In a mechanism for restricting unsafe machine motions while allowing safe machine motions to remain unrestricted, a manual control element which is moved in one direction by an operator to initiate a machine motion, a coacting control device for a machine motion which responds to the movement of the manual control element when the machine motion being initiated is a safe motion, a fluid link in the form of a cylinder body and piston within the cylinder body connected between the manual control element and said control device, a multi-way valve having a connection with said cylinder body and adapted in one position to deliver pressurized fluid to the cylinder body on one side of said piston and in a second position to terminate the delivery of pressurized fluid to the cylinder body and allow fluid from the cylinder body to pass through the valve to a sump in a substantially unpressurized state, said cylinder body also connected with said sump by a second fluid flow path on the other side of said piston so that substantially unpressurized fluid can be drawn from the sump and delivered to said cylinder body when said valve is in the second position, said fluid link being "hard" when the valve is in said first position and being "soft" when the valve is in the second position, and a safe and unsafe machine motion sensing means connected with said valve whereby the valve is normally maintained in said one position delivering pressurized fluid to the cylinder body when a safe machine motion is sensed but is biased to its second position whenever an unsafe machine motion is sensed, whereby said fluid link is then rendered "soft".

10. In a mechanism as defined in claim 9, and said multi-way valve is a solenoid valve normally maintained in said one position delivering pressurized fluid to said cylinder body when the solenoid is energized and being biased to its second position terminating the delivery of pressurized fluid to the cylinder body when the solenoid is de-energized, and said safe and unsafe machine motion sensing means being an electrical means connected with the solenoid of said valve and maintaining the solenoid normally energized while a safe machine motion is being sensed and de-energizing the solenoid when an unsafe machine motion is being sensed.

11. In a mechanism as defined in claim 10, and said coacting control device comprising a control valve having a shiftable spool, said piston of the fluid link connected to said spool and said cylinder body connected to said manual control element.

12. In a mechanism for restricting unsafe machine motions without restricting safe machine motions, a manual control element movable to initiate a machine motion, a machine motion control device associated with said manual control element, a fluid link connected between said manual control element and said control device, and means including a pressurized fluid supply device for delivering pressurized fluid to said fluid link to render the link "hard" in both directions of movement of said manual control element and for receiving fluid circulating to and from the fluid link when the link is "soft" in at least one direction of movement of said manual control element selectively, and a safe and unsafe machine motion sensing means coupled with said pressurized fluid supply device and normally conditioning the supply device to deliver pressurized fluid to said fluid link to render the link "hard", said sensing means adapted to condition the supply device to interrupt the delivery of pressurized fluid to the fluid link whereby the link is rendered "soft" in at least one direction when the sensing means senses an unsafe machine motion, said pressurized fluid supply device comprising an electrically operated valve, and said sensing means comprising an electrical means which delivers an electrical signal to said valve while sensing a safe machine motion to condition the valve to deliver pressurized fluid to the fluid link, the electrical signal terminating when the sensing means is sensing an unsafe machine motion and then conditioning said valve to block the delivery of pressurized fluid to the fluid link.

* * * * *